United States Patent
Qu et al.

(10) Patent No.: US 12,335,200 B2
(45) Date of Patent: Jun. 17, 2025

(54) REFERENCE SIGNAL TRANSMISSION METHOD AND APPARATUS

(71) Applicant: Huawei Technologies Co., Ltd., Shenzhen (CN)

(72) Inventors: Bingyu Qu, Beijing (CN); Mingxin Gong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 17/936,619

(22) Filed: Sep. 29, 2022

(65) Prior Publication Data

US 2023/0029215 A1 Jan. 26, 2023

Related U.S. Application Data

(63) Continuation of application No. PCT/CN2020/082475, filed on Mar. 31, 2020.

(51) Int. Cl.
*H04L 5/00* (2006.01)

(52) U.S. Cl.
CPC .......... *H04L 5/0073* (2013.01); *H04L 5/0005* (2013.01); *H04L 5/0051* (2013.01)

(58) Field of Classification Search
CPC ... H04L 5/0073; H04L 5/0005; H04L 5/0051; H04L 5/0007; H04L 5/0016; H04L 27/261; H04L 5/0048
See application file for complete search history.

(56) References Cited

U.S. PATENT DOCUMENTS

2021/0185706 A1* 6/2021 Park ................ H04W 72/23

FOREIGN PATENT DOCUMENTS

| CN | 105245320 A | 1/2016 |
|---|---|---|
| CN | 108289021 A | 7/2018 |
| CN | 108886448 A | 11/2018 |
| CN | 110036679 A | 7/2019 |
| EP | 3413495 A1 | 12/2018 |

OTHER PUBLICATIONS

3GPP TS 36.211 ("3rd Generation Partnership Project; Technical Specification Group Radio Access Network; Evolved Universal Terrestrial Radio Access (E-UTRA); Physical channels and modulation (Release 13)". V13.11.0, Jun. 24, 2019 (Jun. 24, 2019), pp. 1-173) (Year: 2019).*

(Continued)

*Primary Examiner* — Shailendra Kumar
(74) *Attorney, Agent, or Firm* — Slater Matsil, LLP

(57) ABSTRACT

This application provides a reference signal transmission method. The method includes: A transmit end determines a time-frequency resource occupied by a reference signal, where the time-frequency resource includes M symbols in time domain and N subcarriers corresponding to each of the M symbols in frequency domain, M is an integer greater than or equal to 2, and N is an integer greater than 1; the transmit end generates a reference signal sequence with a length of M×N, and maps the reference signal sequence to the time-frequency resource for sending; and accordingly, a receive end receives the reference signal on the time-frequency resource.

22 Claims, 10 Drawing Sheets

(56) References Cited

OTHER PUBLICATIONS

3GPP TS 38.211, "3rd Generation Partnership Project; Technical Specification Group Radio Access Network; NR; Physical channels and modulation (Release 16)", V16.0.0 Jan. 11, 2020 (Jan. 11, 2020), pp. 1-129) (Year: 2020).*
3GPP TS 36.211 V13.11.0 (Jun. 2019), 3rd Generation Partnership Project; Technical Specification Group Radio Access Network; Evolved Universal Terrestrial Radio Access (E-UTRA); Physical channels and modulation (Release 13), 173 pages.
3GPP TS 38.211 V16.0.0 (Dec. 2019), 3rd Generation Partnership Project; Technical Specification Group Radio Access Network; NR; Physical channels and modulation (Release 16), 129 pages.

* cited by examiner

REFERENCE SIGNAL TRANSMISSION METHOD AND APPARATUS

CROSS-REFERENCE TO RELATED APPLICATIONS

This application is a continuation of International Application No. PCT/CN2020/082475, filed on Mar. 31, 2020, the disclosure of which is hereby incorporated by reference in its entirety.

TECHNICAL FIELD

This application relates to the communication field, and in particular, to a reference signal transmission method and apparatus.

BACKGROUND

In a communication system, for example, a long term evolution (LTE) system or a new radio (NR) system, a reference signal is usually used for channel estimation, to obtain information about a channel between a network device and a terminal device. The reference signal may be, for example, a sounding reference signal (SRS) or a demodulation reference signal (DMRS).

On a same time-frequency resource, orthogonal reference signals do not interfere with each other, and non-orthogonal reference signals interfere with each other. Reference signals of users in different cells may be non-orthogonal. In addition, to expand a capacity of a reference signal in one cell, reference signals of users in a same cell may also be non-orthogonal. Interference between non-orthogonal reference signals causes deterioration of channel estimation quality. Therefore, how to reduce the interference between the non-orthogonal reference signals becomes an urgent problem to be resolved.

SUMMARY

This application provides a reference signal transmission method and apparatus, to help reduce interference between non-orthogonal reference signals, thereby improving channel estimation performance.

According to a first aspect, a reference signal transmission method is provided. The method includes: determining a time-frequency resource occupied by a reference signal, where the time-frequency resource includes M symbols in time domain and N subcarriers corresponding to each of the M symbols in frequency domain, M is an integer greater than or equal to 2, and N is an integer greater than 1; generating a reference signal sequence with a length of M×N; and mapping the reference signal sequence to the time-frequency resource for sending.

In this embodiment of this application, the length of the reference signal sequence generated by a transmit end is M×N, and "×" represents a multiplication sign. The transmit end may map the reference signal sequence to the time-frequency resource occupied by the reference signal sequence for sending. The M symbols of the time-frequency resource correspond to one entire reference signal sequence. In other words, each of the M symbols corresponds to a different sequence. When different sequences are used on two symbols, signals on a plurality of symbols are combined at a receive end. A coherent superposition effect is achieved for the signals, but only an energy superposition effect is achieved for interference, so that the interference is equivalently reduced. Therefore, after receiving the reference signal sequence, the receive end may combine signals on the M symbols, to obtain the reference signal sequence with the length of M×N. A longer sequence indicates existence of sequences with lower cross-correlation.

Therefore, in the reference signal transmission method in this embodiment of this application, one long reference signal sequence is generated, and one complete reference signal sequence is mapped to a plurality of symbols. This helps reduce interference between non-orthogonal reference signals, to improve channel estimation performance.

It should be understood that the reference signal sequence may be mapped to the time-frequency resource in a plurality of mapping manners. The transmit end may directly map the reference signal sequence to the time-frequency resource, or may process the reference signal sequence, and then map a processed reference signal sequence to the time-frequency resource. This is not limited in this embodiment of this application. In a possible implementation, the transmit end may first multiply sequences on a plurality of symbols by an orthogonal cover code (OCC), that is, multiply a sequence on an $n^{th}$ symbol by an $n^{th}$ element of the OCC code, and then map the sequence to a corresponding time-frequency resource, to ensure that the sequences on the plurality of symbols are orthogonal, and no interference is generated.

With reference to the first aspect, in some implementations of the first aspect, the M symbols are consecutive in time domain, and reference signals on the M symbols occupy a same sub-band in frequency domain.

That reference signals on the M symbols occupy a same sub-band in frequency domain may also mean that the reference signals on the M symbols may be for estimating a channel of the same sub-band. For example, it is assumed that there are 20 subcarriers (numbered 0 to 19) in total, and M=2. If reference signals on two symbols are both for estimating a channel of subcarriers 0 to 9, it may be considered that the reference signals on the two symbols are for estimating a channel of a same bandwidth. If a reference signal on one symbol is for estimating a channel of subcarriers 0 to 9, and the other symbol is for estimating a channel of subcarriers 10 to 19, it may be considered that reference signals on the two symbols are for estimating channels of different bandwidths. However, it should be understood that, in a protocol, the reference signals are for estimating the channel of the subcarriers 0 to 9, and the reference signal sequence does not necessarily occupy all the subcarriers 0 to 9. The reference signal sequence may occupy all or some of the subcarriers 0 to 9, for example, odd-numbered subcarriers or even-numbered subcarriers. In this case, one of the two symbols occupies the subcarriers 0, 2, 4, 6, and 8, and the other symbol occupies the subcarriers 1, 3, 5, 7, and 9. It may also be considered that the reference signals on the two symbols are for estimating the channel of the same sub-band.

With reference to the first aspect, in some implementations of the first aspect, each of the M symbols corresponds to N subcarriers of a same comb.

With reference to the first aspect, in some implementations of the first aspect, a first symbol in the M symbols corresponds to N subcarriers of a first comb, a second symbol in the M symbols corresponds to N subcarriers of a second comb, and the first comb and the second comb are different.

When subcarriers of the M symbols are M different combs in a sub-band, cross-correlation of an original long sequence can be better retained, cross-correlation between different sequences can be reduced, and interference is reduced.

A comb indicates equally spaced subcarriers. For example, the subcarriers are divided into two combs, the first comb may correspond to odd-numbered subcarriers (1, 3, 5, 7, 9, . . . ), and the second comb may correspond to even-numbered subcarriers (0, 2, 4, 6, 8, . . . ). Each of the M symbols may correspond to the subcarriers of the first comb, or may correspond to the subcarriers of the second comb. Alternatively, some symbols correspond to the subcarriers of the first comb, and some symbols correspond to the subcarriers of the second comb. This is not limited in this embodiment of this application.

In a possible design, there are at least two symbols (the first symbol and the second symbol) in the M symbols, the first symbol corresponds to the N subcarriers of the first comb, and the second symbol corresponds to the N subcarriers of the second comb. In another possible design, each of the M symbols corresponds to N subcarriers of different combs. For example, M=3. The three symbols include the first symbol, the second symbol, and a third symbol, the first symbol corresponds to the N subcarriers of the first comb, the second symbol corresponds to the N subcarriers of the second comb, the third symbol corresponds to N subcarriers of the third comb, and the first comb, the second comb, and the third comb are different.

With reference to the first aspect, in some implementations of the first aspect, any two of the M symbols correspond to different combs. In the time-frequency resource, an element mapped to a subcarrier p is a $p^{th}$ element in the reference signal sequence, p is a number (which may also be understood as an absolute number of the subcarrier) obtained by sorting subcarriers in the time-frequency resource in descending order or ascending order of subcarrier frequencies, and p is an integer greater than or equal to 0.

The reference signal sequence is mapped in a manner in which different symbols correspond to different combs and the absolute number of the subcarrier corresponds to an element number of the reference signal sequence. Channels of adjacent symbols may be considered as basically unchanged. The receive end may combine signals on a plurality of symbols to form a complete signal, so that the cross-correlation of the original long sequence can be better retained, the cross-correlation between the different sequences is reduced, and the interference is reduced.

With reference to the first aspect, in some implementations of the first aspect, in the time-frequency resource, an element mapped to a symbol m in the M symbols and a subcarrier n in N subcarriers corresponding to the symbol m is a $k_{m,\ n,\ th}$ element in the reference signal sequence.

$k_{m,\ n}$ satisfies any one of the following formulas:

$k_{m,n}=n+m\times N,$ $k_{m,n}=M\times n+m,$ $k_{m,n}=n+(M-1-m)\times N,$ and $k_{m,n}=M\times n+(M-1-m).$ $n\in\{0,1,\ldots,N-1\},$ and $m\in\{0,1,\ldots,M-1\}$ The foregoing four formulas respectively correspond to four mapping manners. In a specific implementation process, the foregoing mapping manners may be implemented by using a formula, a table, or another manner. This is not limited in this embodiment of this application. In a specific implementation process, the mapping manner may be agreed on in a protocol, or may be configured by a network device for a terminal device by using signaling. For example, the network device may configure one or more of the mapping manners for the terminal device by using radio resource control (RRC) signaling. This is not limited in this embodiment of this application.

It should be understood that the subcarrier n is one of the N subcarriers corresponding to the symbol m. The transmit end may number the N subcarriers only after determining, based on the comb, the N subcarriers corresponding to the symbol m, to determine the subcarrier n. The subcarriers are numbered based on a frequency-domain position.

With reference to the first aspect, in some implementations of the first aspect, the reference signal sequence satisfies the following formula:

$r(i)=Ae^{j\alpha i}x_q(i \bmod N_{ZC}),$ where $$x_q(k) = e^{-j\frac{pqk(k+1)}{N_{ZC}}}.$$

r(i) represents an $i^{th}$ element in the reference signal sequence, i is an integer greater than or equal to 0 and less than or equal to M×N−1, $N_{ZC}$ is a maximum prime number less than or equal to M×N or a minimum prime number greater than M×N, q is a positive integer less than $N_{ZC}$, A is a complex number, and a is a real number.

Optionally, a is predefined, or is indicated by the network device by using signaling.

According to a second aspect, another reference signal transmission method is provided. The method includes: determining a time-frequency resource occupied by a reference signal, where the time-frequency resource includes M symbols in time domain and N subcarriers corresponding to each of the M symbols in frequency domain, M is an integer greater than or equal to 2, and N is an integer greater than 1; and receiving the reference signal on the time-frequency resource, where the reference signal is obtained by mapping a reference signal sequence with a length of M×N.

With reference to the second aspect, in some implementations of the second aspect, the M symbols are consecutive in time domain, and reference signals on the M symbols occupy a same sub-band in frequency domain.

With reference to the second aspect, in some implementations of the second aspect, each of the M symbols corresponds to N subcarriers of a same comb.

With reference to the second aspect, in some implementations of the second aspect, a first symbol in the M symbols corresponds to N subcarriers of a first comb, a second symbol in the M symbols corresponds to N subcarriers of a second comb, and the first comb and the second comb are different.

With reference to the second aspect, in some implementations of the second aspect, any two of the M symbols correspond to different combs. In the time-frequency resource, an element mapped to a subcarrier p is a $p^{th}$ element in the reference signal sequence, p is a number obtained by sorting subcarriers in the time-frequency resource in descending order or ascending order of subcarrier frequencies, and p is an integer greater than or equal to 0.

With reference to the second aspect, in some implementations of the second aspect, in the time-frequency resource, an element mapped to a symbol m in the M symbols and a subcarrier n in N subcarriers corresponding to the symbol m is a $k_{m,\ n,\ th}$ element in the reference signal sequence.

$k_{m,n}$ satisfies any one of the following formulas:

$$k_{m,n}=n+m\times N,$$

$$k_{m,n}=M\times n+m,$$

$$k_{m,n}=n+(M-1-m)\times N, \text{ and}$$

$$k_{m,n}=M\times n+(M-1-m).$$

$n\in\{0,1,\ldots,N-1\}$, and $m\in\{0,1,\ldots,M-1\}$.

With reference to the second aspect, in some implementations of the second aspect, the reference signal sequence satisfies the following formula:

$$r(i)=Ae^{j\alpha i}x_q(i \bmod N_{ZC}), \text{ where}$$

$$x_q(k) = e^{-j\frac{pqk(k+1)}{N_{ZC}}}.$$

r(i) represents an $i^{th}$ element in the reference signal sequence, i is an integer greater than or equal to 0 and less than or equal to M×N−1, $N_{ZC}$ is a maximum prime number less than or equal to M×N or a minimum prime number greater than M×N, q is a positive integer less than $N_{ZC}$, A is a complex number, and a is a real number.

Optionally, a is predefined, or is indicated by a network device by using signaling.

According to a third aspect, a reference signal transmission apparatus is provided. The apparatus is configured to perform the method according to any possible implementation of the foregoing aspects. Specifically, the apparatus includes units configured to perform the method according to any possible implementation of the foregoing aspects.

According to a fourth aspect, another reference signal transmission apparatus is provided. The apparatus includes a processor. The processor is coupled to a memory, and may be configured to execute instructions in the memory, to implement the method according to any possible implementation of the foregoing aspects. Optionally, the communication apparatus further includes the memory. Optionally, the communication apparatus further includes a communication interface, and the processor is coupled to the communication interface.

In an implementation, the reference signal transmission apparatus is a terminal device. When the reference signal transmission apparatus is the terminal device, the communication interface may be a transceiver or an input/output interface.

In another implementation, the reference signal transmission apparatus is a chip disposed in a terminal device. When the reference signal transmission apparatus is the chip disposed in the terminal device, the communication interface may be an input/output interface.

In an implementation, the reference signal transmission apparatus is a network device. When the reference signal transmission apparatus is the network device, the communication interface may be a transceiver or an input/output interface.

In another implementation, the reference signal transmission apparatus is a chip disposed in a network device. When the reference signal transmission apparatus is the chip disposed in the network device, the communication interface may be an input/output interface.

According to a fifth aspect, a processor is provided. The processor includes an input circuit, an output circuit, and a processing circuit. The processing circuit is configured to receive a signal through the input circuit, and transmit a signal through the output circuit, to enable the processor to perform the method according to any possible implementation of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a sixth aspect, a processing apparatus is provided. The processing apparatus includes a processor and a memory. The processor is configured to: read instructions stored in the memory, receive a signal through a receiver, and transmit a signal through a transmitter, to perform the method according to any possible implementation of the foregoing aspects.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated into one chip, or may be separately disposed in different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the sixth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a seventh aspect, a computer program product is provided. The computer program product includes a computer program (which may also be referred to as code or instructions). When the computer program is run, a computer is enabled to perform the method according to any possible implementation of the foregoing aspects.

According to an eighth aspect, a computer-readable storage medium is provided. The computer-readable storage medium stores a computer program (which may also be referred to as code or instructions). When the computer program is run on a computer, the computer is enabled to perform the method according to any possible implementation of foregoing aspects.

According to a ninth aspect, a communication system is provided. The communication system includes the foregoing terminal device and network device.

DETAILED DESCRIPTION OF ILLUSTRATIVE EMBODIMENTS

The following describes technical solutions of this application with reference to accompanying drawings.

The technical solutions in embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a 5th generation (5G) system, or a new radio (NR) system and evolution of the NR system.

It should be further understood that the technical solutions in embodiments of this application may be further applied to various systems based on orthogonal frequency division multiplexing (OFDM), filter bank multi-carrier (FBMC), generalized frequency division multiplexing (GFDM), filtered orthogonal frequency division multiplexing (F-OFDM), and the like.

Figure 1:
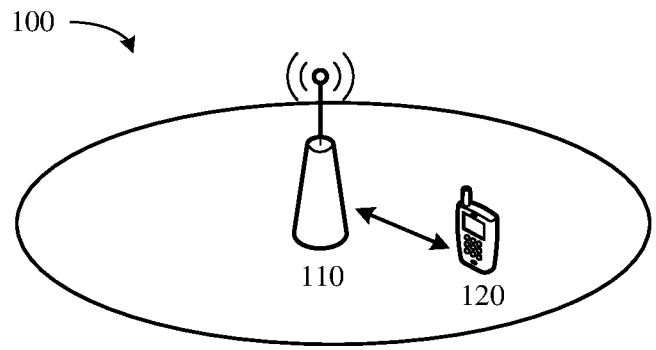
FIG. 1 is a schematic diagram of a communication system according to an embodiment of this application.

To facilitate understanding of embodiments of this application, a communication system applicable to embodiments of this application is first described in detail with reference to FIG. 1. FIG. 1 is a schematic diagram of a communication system applicable to an embodiment of this application. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 may communicate with the terminal device 120 through a radio link. A plurality of antennas may be configured for each communication device such as the network device 110 or the terminal device 120. The plurality of antennas may include at least one transmit antenna configured to send a signal and at least one receive antenna configured to receive a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device 110 may communicate with the terminal device 120 by using a multi-antenna technology.

The terminal device in embodiments of this application may communicate with one or more core networks through a radio access network (RAN). The terminal device may be referred to as an access terminal, user equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN).

The network device in embodiments of this application may be a device configured to communicate with the terminal device. The network device may be a base transceiver station (BTS) in global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a scenario of a cloud radio access network (CRAN). Alternatively, the network device may be a relay station, an access point, a vehicle-mounted device, a wearable device, a network device in a future 5G network, a network device in a future evolved PLMN network, or the like. This is not limited in embodiments of this application. For example, the network device may be a gNB or a transmission point (TRP or TP) in an NR system, one antenna panel or a group of (including a plurality of antenna panels) antenna panels of a base station in a 5G system, or a network node, for example, a baseband unit (BBU) or a distributed unit (DU), that constitutes a gNB or a transmission point.

In some deployments, the gNB may include a centralized unit (CU) and the DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the CU. It may be understood that the network device may be a CU node, a DU node, or a device including a CU node and a DU node. In addition, the CU may be classified as a network device in an access network (RAN), or may be classified as a network device in a core network (CN). This is not limited in this application.

The network device may also be a generic term of all devices on a network side. For example, when a plurality of TRPs are used to transmit data to the terminal device, the plurality of TRPs may be collectively referred to as network devices.

In embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD)), a smart card and a flash memory component (for example, erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

Embodiments of this application are applicable to an LTE system and a subsequent evolved system such as 5G, or another wireless communication system that uses various radio access technologies, for example, a system that uses an access technology such as code division multiple access, frequency division multiple access, time division multiple access, orthogonal frequency division multiple access, or single carrier frequency division multiple access, and are particularly applicable to a scenario that requires channel information feedback and/or a two-stage precoding technology, for example, a wireless network using a massive MIMO technology, or a wireless network using a distributed antenna technology.

It should be understood that a multiple-input multiple-output (MIMO) technology means that a transmit end device and a receive end device respectively use a plurality of transmit antennas and a plurality of receive antennas, so that a signal is transmitted and received by using the plurality of antennas of the transmit end device and the receive end device, to improve communication quality. The MIMO technology can fully use spatial resources, implement multiple-input multiple-output through a plurality of antennas, and multi-fold increase a system channel capacity without increasing a spectrum resource and an antenna transmit power.

For ease of understanding, the following first describes related terms in embodiments of this application.

1. Reference Signal

The reference signal (RS) may also be referred to as a "pilot" signal, and is a known signal that is provided by a transmit end to a receive end and that is for channel estimation or channel sounding. Reference signals are classified into uplink reference signals and downlink reference signals.

The uplink reference signal is a signal sent by a terminal device to a network device, where the transmit end is the terminal device, and the receive end is the network device. The uplink reference signal is used for two purposes: uplink channel estimation (used by the network device to perform coherent demodulation and detection) and uplink channel measurement (used for calculating spatial domain precoding). The uplink reference signal may include a DMRS and an SRS. The DMRS is related to sending of a physical uplink shared channel (PUSCH) or a physical uplink control channel (PUCCH), and is for obtaining a channel estimation matrix, to help perform demodulation. The SRS may be independently sent, and is for uplink channel measurement, for example, calculating a signal to interference plus noise ratio (SINR) of an uplink channel. The SRS may also be for obtaining an uplink channel coefficient. In a TDD scenario, reciprocity exists between uplink and downlink channels. Therefore, the SRS may be further for obtaining a downlink channel coefficient.

The downlink reference signal is a signal sent by the network device to the terminal device, where the transmit end is the network device, and the receive end is the terminal device. The downlink reference signal is mainly used for downlink channel estimation (used by the terminal device to perform coherent detection and demodulation), downlink channel measurement (channel sounding), cell search, and the like. The downlink reference signal may include a DMRS, a cell-specific reference signal (CRS), a multicast-broadcast single-frequency network reference signal (multicast-broadcast single-frequency network reference signal, MBSFN-RS), a position reference signal (P-RS), or a channel state information-reference signal (CSI-RS).

It should be understood that the reference signal in this application may be the foregoing reference signal of any type.

2. Time-Frequency Resource

The time-frequency resource is short for a time domain resource and a frequency domain resource. In time domain, a minimum resource granularity is one symbol. In frequency domain, a minimum resource granularity is one subcarrier. One subcarrier on one symbol forms one time-frequency resource element, which may be referred to as a resource element (resource element, RE). Resource mapping is performed at a physical layer on an RE basis. 12 consecutive subcarriers in frequency domain on all symbols in one slot in time domain may form one resource block (resource block, RB), and the RB is a basic unit for resource scheduling.

It should be understood that the "symbol" in this application may include, but is not limited to, any one of the following: an orthogonal frequency division multiplexing (OFDM) symbol, a universal filtered multi-carrier (UFMC) signal, a filter-band multi-carrier (FBMC) symbol, a generalized frequency-division multiplexing (GFDM) symbol, and the like.

3. Comb

The comb is equally spaced subcarriers in frequency domain. For example, subcarriers may be numbered 0, 1, 2, . . . in descending order of frequencies (or subcarriers may be numbered in ascending order of frequencies, or may be numbered in another manner, which is not limited herein), and the subcarriers are divided into two combs. One comb may correspond to odd-numbered subcarriers (1, 3, 5, 7, 9, . . . ), and the other comb may correspond to even-numbered subcarriers (0, 2, 4, 6, 8, . . . ). The two combs may be for transmitting a reference signal. In embodiments of this application, different combs may be different identifiers, and each identifier may be associated with one or more (usually a plurality of) subcarriers, to indicate a resource position.

In a possible implementation, the subcarriers may be numbered in descending order of frequencies, or the subcarriers may be numbered in ascending order of frequencies, and numbers are successively k, k+1, k+2, k+3, k+4, . . . , where k represents an offset of a subcarrier number. These subcarriers are divided into C combs, and C is an integer greater than 1. One comb includes subcarriers numbered k+offset, k+offset+C, k+offset+2C, k+offset+3C, . . . . A value of offset is an integer ranging from 0 to C−1, and the comb varies with the value of offset. For example, a comb whose offset is 0 includes subcarriers numbered k, k+C, k+2C, . . . . Subcarriers on one sub-band may be divided into combs corresponding to different offsets. However, it should be understood that these different combs occupy a same sub-band. The foregoing numbers in descending order or ascending order of frequencies may not be consecutive in some special cases. This is not limited in embodiments of this application.

4. Interference Between Reference Signals

When time-frequency resources used by two reference signals overlap, interference is generated between the two reference signals. Interference between two reference signals depends on cross-correlation between sequences of the two reference signals. Higher cross-correlation indicates greater interference, and lower cross-correlation indicates smaller interference.

5. Coherent Superposition and Energy Superposition

The coherent superposition means that phases of two reference signals are the same, and the reference signals may be added to achieve an effect of in-phase addition. The energy superposition means that a phase difference between two reference signals is random, and the reference signals may be added in phase, or may be cancelled out because the reference signals have opposite phases.

In an existing method, if reference signals on a plurality of consecutive symbols are for estimating a channel of a same bandwidth, each of the plurality of symbols occupies a same subcarrier, and uses a same reference signal sequence. Therefore, on the plurality of symbols, the reference signals and interference are the same. A transmit end sends the reference signals by using the plurality of symbols, and a receive end receives the reference signals from the plurality of symbols, and combines the reference signals on the plurality of symbols. Both the reference signals and the interference have a coherent superposition effect. A final effect is that the interference caused by transmitting the reference signals by using the plurality of symbols is the same as interference caused by transmitting the reference signals by using a single symbol, and depends on cross correlation between two reference signal sequences on the single symbol. In other words, when two non-orthogonal reference signals occupy a same time-frequency resource, the foregoing transmission manner in which the plurality of symbols are used cannot effectively reduce interference between the two non-orthogonal reference signals.

In view of this, embodiments of this application provide a reference signal transmission method and apparatus, to help reduce interference between non-orthogonal reference signals, thereby improving channel estimation or measurement performance.

Before the method provided in embodiments of this application is described, the following descriptions are first provided.

First, in embodiments of this application, "predefined" may be implemented in a manner in which corresponding code, a table, or other related indication information is prestored in a device (for example, including a terminal device and a network device). A specific implementation of the foregoing "predefined" is not limited in this application.

Second, in the following embodiments, terms and English acronyms such as a sounding reference signal (SRS), a demodulation reference signal (DMRS), and a channel state information-reference signal (CSI-RS) are all examples provided for ease of description, and shall not constitute any limitation on this application. This application does not exclude a possibility of defining another term that can implement a same or similar function in an existing protocol or a future protocol.

Third, "first", "second", and various numbers in embodiments shown below are merely used for distinguishing for ease of description, and are not intended to limit the scope of embodiments of this application. For example, the numbers are used to distinguish between different reference signals and different information.

Fourth, a "protocol" in embodiments of this application may be a standard protocol in the communication field, for example, may include an LTE protocol, an NR protocol, and a related protocol applied to a future communication system. This is not limited in this application.

Fifth, "at least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, and c may indicate a, b, c, a and b, a and c, b and c, or a, b, and c, where a, b, or c may be singular or plural.

Sixth, in this application, for ease of description, symbols in time domain are consecutively numbered starting from 0, and subcarriers in frequency domain are numbered starting from 0. Certainly, specific implementation is not limited thereto. For example, the foregoing symbols and subcarriers may alternatively be numbered starting from 1. It should be noted that the foregoing descriptions are provided for ease of describing the technical solutions provided in embodiments of this application, but are not intended to limit the scope of this application.

The following describes in detail the reference signal transmission method and apparatus provided in this application with reference to the accompanying drawings. It should be understood that the technical solutions in this application may be applied to a wireless communication system, for example, the communication system 100 shown in FIG. 1. There is a wireless communication connection between two communication apparatuses in the wireless communication system. One of the two communication apparatuses may correspond to the terminal device 120 shown in FIG. 1, for example, may be the terminal device in FIG. 1, or may be a chip disposed in the terminal device. The other one of the two communication apparatuses may correspond to the network device no shown in FIG. 1, for example, may be the network device in FIG. 1, or may be a chip disposed in the network device.

The terminal device may be used as a transmit end, or may be used as a receive end. Correspondingly, the network device may be used as a receive end, or may be used as a transmit end. Without loss of generality, the following describes in detail the reference signal transmission method provided in embodiments of this application by using a process of interaction between the transmit end and the receive end as an example.

Figure 2:
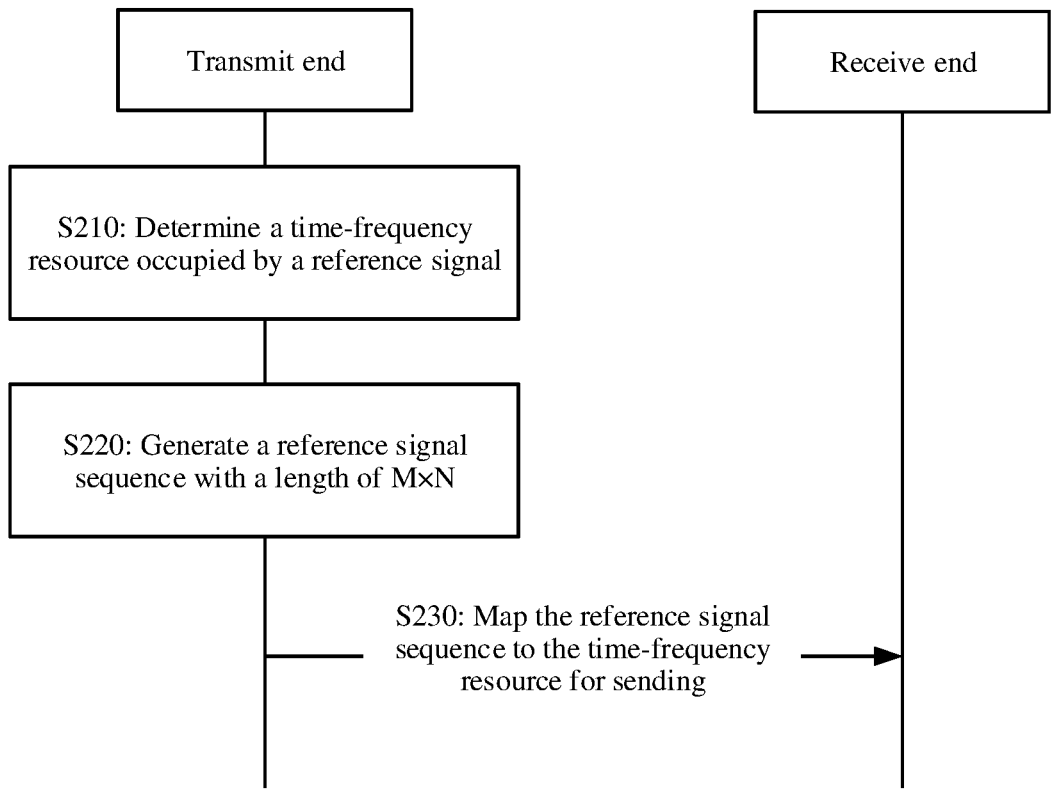
FIG. 2 is a schematic flowchart of a reference signal transmission method according to an embodiment of this application.

FIG. 2 is a schematic flowchart of a reference signal transmission method 200 according to an embodiment of this application. The method may be applied to the communication system shown in FIG. 1. This is not limited in this embodiment of this application. The method 200 includes the following steps:

S210: A transmit end determines a time-frequency resource occupied by a reference signal, where the time-frequency resource includes M symbols in time domain and N subcarriers corresponding to each of the M symbols in frequency domain, M is an integer greater than or equal to 2, and N is an integer greater than 1.

S220: The transmit end generates a reference signal sequence with a length of M×N.

S230: The transmit end maps the reference signal sequence to the time-frequency resource for sending. Accordingly, a receive end receives the reference signal sequence.

In this embodiment of this application, the length of the reference signal sequence generated by the transmit end is M×N, and "×" represents a multiplication sign. The transmit end may map the reference signal sequence to the time-frequency resource occupied by the reference signal sequence for sending. The M symbols of the time-frequency resource correspond to one entire reference signal sequence. In other words, each of the M symbols corresponds to a different sequence. When different sequences are used on two symbols, signals on a plurality of symbols are combined at the receive end. A coherent superposition effect is achieved for the signals, but only an energy superposition effect is achieved for interference, so that the interference is equivalently reduced. Therefore, after receiving the reference signal sequence, the receive end may combine signals on the M symbols, to obtain the reference signal sequence with the length of M×N. A longer sequence indicates existence of sequences with lower cross-correlation.

Therefore, in the reference signal transmission method in this embodiment of this application, one long reference signal sequence is generated, and one complete reference signal sequence is mapped to a plurality of symbols. This helps reduce interference between non-orthogonal reference signals, to improve channel estimation performance.

It should be understood that a terminal device may generate the reference signal sequence in a plurality of manners. This is not limited in this embodiment of this application. In a possible design, the reference signal sequence is a sequence generated by processing a ZC (Zadoff-Chu) sequence. The processing may be cyclic extension or truncation, or may include a time domain cyclic shift. For example, at least one operation of the cyclic extension, the truncation, or the time domain cyclic shift is performed on the ZC sequence, to generate the reference signal sequence that satisfies the following formula:

$$r(i)=Ae^{jai}x_q(i \bmod N_{ZC}), \text{ where}$$

$$x_q(k) = e^{-j\frac{pqk(k+1)}{N_{ZC}}}.$$

j is a unit of an imaginary number, r(i) represents an $i^{th}$ element in the reference signal sequence, i is an integer greater than or equal to 0 and less than or equal to M×N−1, $N_{ZC}$ is a maximum prime number less than or equal to M×N or a minimum prime number greater than M×N, q is a positive integer less than $N_{ZC}$, A is a complex number independent of i, a is a real number independent of i, and $e^{jai}$ represents the time domain cyclic shift. Optionally, a is predefined, or is indicated by a network device by using signaling.

It should be further understood that the reference signal sequence may be mapped to the time-frequency resource in a plurality of mapping manners. The transmit end may directly map the reference signal sequence to the time-frequency resource, or may process the reference signal sequence, and then map a processed reference signal sequence to the time-frequency resource. This is not limited in this embodiment of this application. In a possible implementation, the transmit end may first multiply sequences on a plurality of symbols by an orthogonal cover code (OCC), that is, multiply a sequence on an $n^{th}$ symbol by an $n^{th}$ element of the OCC code, and then map the sequence to a corresponding time-frequency resource, to ensure that the sequences on the plurality of symbols are orthogonal, and no interference is generated. For example, two OCC codes whose lengths are 2 may be [+1, +1] and [+1, −1], and four OCC codes whose lengths are 4 may be [+1, +1, +1, +1], [+1, +1, −1, −1], [+1, −1, +1, −1], and [+1, −1, −1, +1]. For example, an OCC code currently used by the transmit end is [+1, −1]. The transmit end may multiply a sequence on the $1^{st}$ symbol by +1, and multiply a sequence on the $2^{nd}$ symbol by −1.

In an optional embodiment, the M symbols are consecutive in time domain, or reference signals on the M symbols occupy a same sub-band in frequency domain. The reference signals on the M symbols may be for estimating a channel of a same sub-band.

For example, it is assumed that there are 20 subcarriers (numbered 0 to 19) in total, and M=2. If reference signals on two symbols are both for estimating a channel of subcarriers 0 to 9, it may be considered that the reference signals on the two symbols are for estimating a channel of a same bandwidth. If a reference signal on one symbol is for estimating a channel of subcarriers 0 to 9, and the other symbol is for estimating a channel of subcarriers 10 to 19, it may be considered that reference signals on the two symbols are for estimating channels of different bandwidths. However, it should be understood that, in a protocol, the reference signals are for estimating the channel of the subcarriers 0 to 9, and the reference signal sequence does not necessarily occupy all the subcarriers 0 to 9. The reference signal sequence may occupy all or some of the subcarriers 0 to 9, for example, odd-numbered subcarriers or even-numbered subcarriers. In this case, one of the two symbols occupies the subcarriers 0, 2, 4, 6, and 8, and the other symbol occupies the subcarriers 1, 3, 5, 7, and 9. It may also be considered that the reference signals on the two symbols are for estimating the channel of the same sub-band.

It should be understood that the N subcarriers corresponding to each of the M symbols in frequency domain may be the same or may be different. This is not limited in this embodiment of this application. In a possible implementation, each of the M symbols corresponds to N subcarriers of a same comb.

In another possible implementation, subcarriers of the M symbols are M different combs in a sub-band. For example, a first symbol in the M symbols corresponds to N subcarriers of a first comb, a second symbol in the M symbols corresponds to N subcarriers of a second comb, and the first comb and the second comb are different. When the subcarriers of the M symbols are the M different combs in the sub-band, cross-correlation of an original long sequence can be better retained, cross-correlation between different sequences can be reduced, and interference is reduced.

A comb indicates equally spaced subcarriers. For example, the subcarriers are divided into two combs, the first comb may correspond to odd-numbered subcarriers (1, 3, 5, 7, 9, . . . ), and the second comb may correspond to even-numbered subcarriers (o, 2, 4, 6, 8, . . . ). Each of the M symbols may correspond to the subcarriers of the first comb, or may correspond to the subcarriers of the second comb. Alternatively, some symbols correspond to the subcarriers of the first comb, and some symbols correspond to the subcarriers of the second comb. This is not limited in this embodiment of this application.

In a possible design, there are at least two symbols (the first symbol and the second symbol) in the M symbols, the first symbol corresponds to the N subcarriers of the first comb, and the second symbol corresponds to the N subcarriers of the second comb. In another possible design, each of the M symbols corresponds to N subcarriers of different combs. For example, M=3. The three symbols include the first symbol, the second symbol, and a third symbol, the first symbol corresponds to the N subcarriers of the first comb, the second symbol corresponds to the N subcarriers of the second comb, the third symbol corresponds to N subcarriers of the third comb, and the first comb, the second comb, and the third comb are different.

In an optional embodiment, in the time-frequency resource, an element mapped to a symbol m in the M symbols and a subcarrier n in N subcarriers corresponding to the symbol m is a $k_{m, n, th}$ element in the reference signal sequence.

$k_{m, n}$ satisfies any one of the following formulas:

$$k_{m,n} = n + m \times N,$$

$$k_{m,n} = M \times n + m,$$

$$k_{m,n} = n + (M-1-m) \times N, \text{ and}$$

$$k_{m,n} = M \times n + (M-1-m).$$

$n \in \{0, 1, \ldots, N-1\}$, and $m \in \{0, 1, \ldots, M-1\}$.

The foregoing four formulas respectively correspond to four mapping manners. The following provides detailed descriptions with reference to FIG. 3 to FIG. 10. In FIG. 3 to FIG. 7, a horizontal coordinate indicates a time domain, and a vertical coordinate indicates a frequency domain. The time domain includes two symbols, and the frequency domain includes 2N subcarriers. That is, reference signals corresponding to the two symbols are for estimating channels of the 2N subcarriers. It should be noted that the accompanying drawings that indicate time-frequency resources and that are included in this application are all examples for description. A person skilled in the art may understand that specific implementation is not limited thereto.

It should be understood that the subcarrier n is one of the N subcarriers corresponding to the symbol m. The transmit end may number the N subcarriers only after determining, based on the comb, the N subcarriers corresponding to the symbol m, to determine the subcarrier n.

1. First Mapping Manner: $k_{m,n} = n + m \times N$

It may be learned from the foregoing formula that, when m=0 and n=0, $k_{0,0}=0$, that is, an element on a symbol 0 and a subcarrier 0 corresponding to the symbol 0 is the $0^{th}$ element r(0) in the reference signal sequence. When m=1 and n=0, $k_{1,0}=N$, that is, an element on a symbol 1 and a subcarrier 0 corresponding to the symbol 1 is an $N^{th}$ element r(N) in the reference signal sequence. When m=0 and n=1, $k_{0,1}=1$, that is, an element on a symbol 0 and a subcarrier 1 corresponding to the symbol 0 is the $1^{st}$ element r(1) in the reference signal sequence. When m=1 and n=1, $k_{1,1}=1+N$, that is, an element on a symbol 1 and a subcarrier 1 corresponding to the symbol 1 is an $(N+1)^{th}$ element r(N+1) in the reference signal sequence. Therefore, the first mapping manner indicated by the foregoing formula is performing mapping in order of numbers of symbols. To be specific, N subcarriers corresponding to the $1^{st}$ symbol are first mapped, then N subcarriers corresponding to the $2^{nd}$ symbol are mapped, and so on, until subcarriers corresponding to the M symbols are completely mapped.

Figure 3:
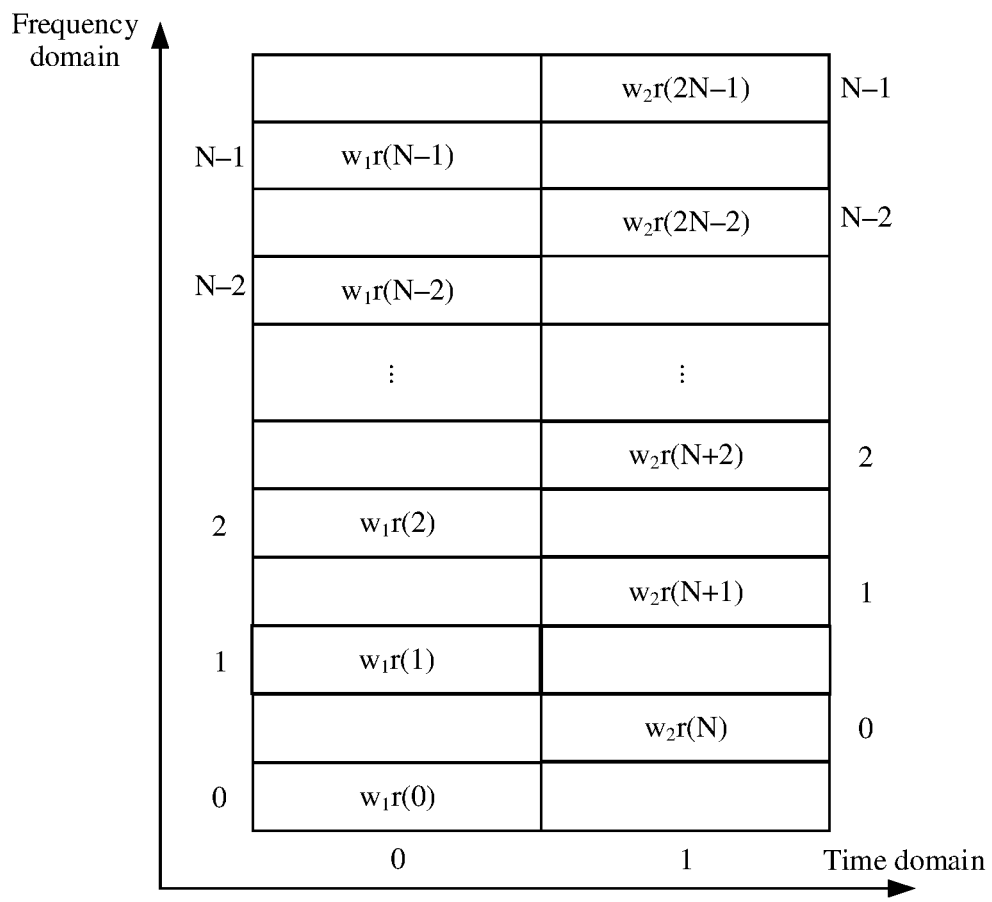
FIG. 3 is a schematic diagram of a mapping manner of a reference signal sequence according to an embodiment of this application.
Figure 4:
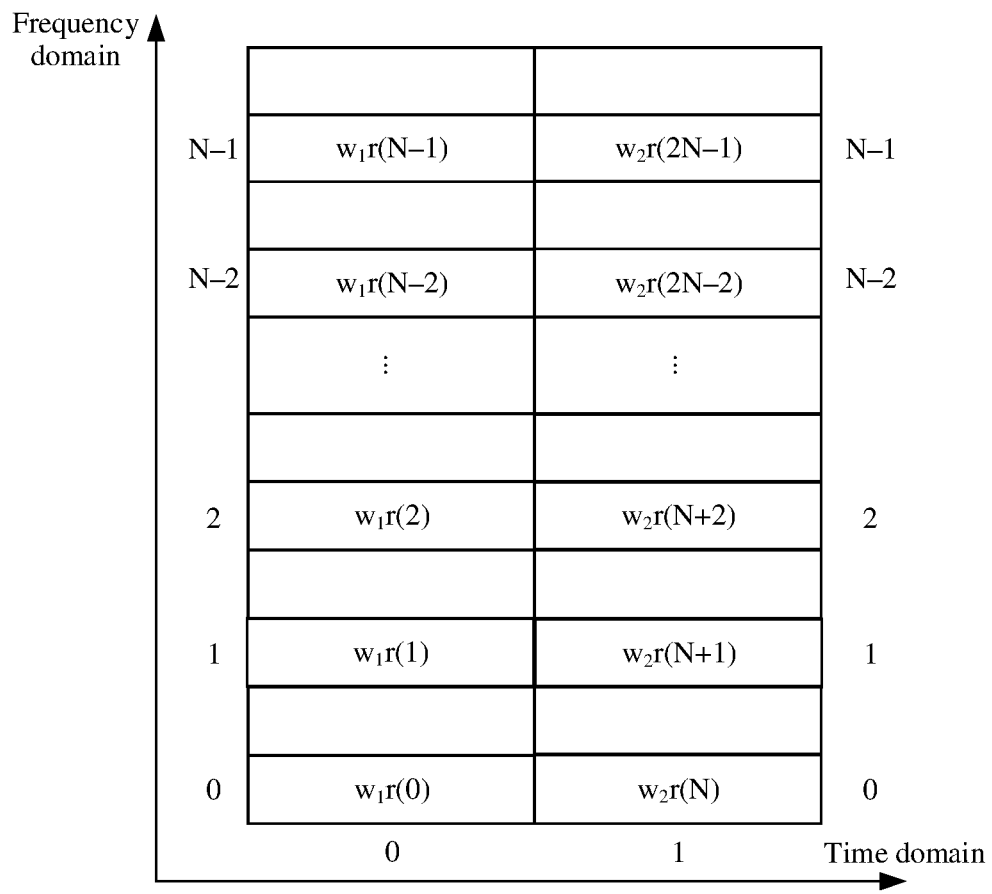
FIG. 4 is a schematic diagram of another mapping manner of a reference signal sequence according to an embodiment of this application.

For example, it is assumed that M=2. If sequences on adjacent symbols are multiplied by the OCC ([$w_1, w_2$]=[1,1] or [$w_1, w_2$]=[1, -1]), schematic diagrams of mapping manners shown in FIG. 3 and FIG. 4 may be obtained. In FIG. 3, combs corresponding to the symbol 0 and the symbol 1 are different. In FIG. 4, combs corresponding to the symbol 0 and the symbol 1 are the same.

2. Second Mapping Manner: $k_{m, n} = M \times n + m$

It may be learned from the foregoing formula that, when m=0 and n=0, $k_{0,0}=0$, that is, an element on a symbol 0 and a subcarrier 0 corresponding to the symbol 0 is the $0^{th}$ element r(0) in the reference signal sequence. When m=1 and n=0, $k_{1,0}=1$, that is, an element on a symbol 1 and a subcarrier 0 corresponding to the symbol 1 is the $1^{st}$ element r(1) in the reference signal sequence. When m=0 and n=1, $k_{0,1}=M$, that is, an element on a symbol 0 and a subcarrier 1 corresponding to the symbol 0 is an $M^{th}$ element r(M) in the reference signal sequence. When m=1 and n=1, $k_{1,1}=M+1$, that is, an element on a symbol 1 and a subcarrier 1 corresponding to the symbol 1 is an $(M+1)^{th}$ element r(M+1) in the reference signal sequence. Therefore, the second mapping manner indicated by the foregoing formula is performing alternate mapping in order of numbers of symbols. To be specific, the $1^{st}$ subcarrier of the $1^{st}$ symbol is first mapped, then the $1^{st}$ subcarrier of the $2^{nd}$ symbol is mapped, and so on, until subcarriers corresponding to the M symbols are completely mapped.

Figure 5:
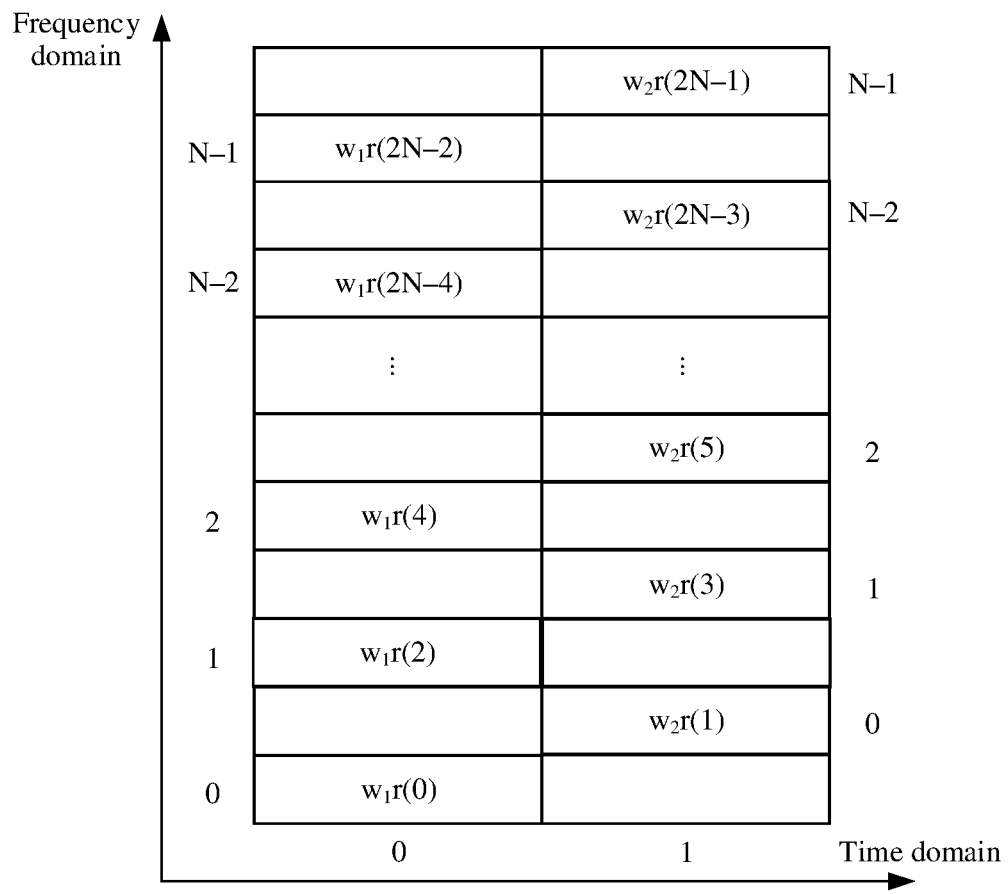
FIG. 5 is a schematic diagram of another mapping manner of a reference signal sequence according to an embodiment of this application.
Figure 6:
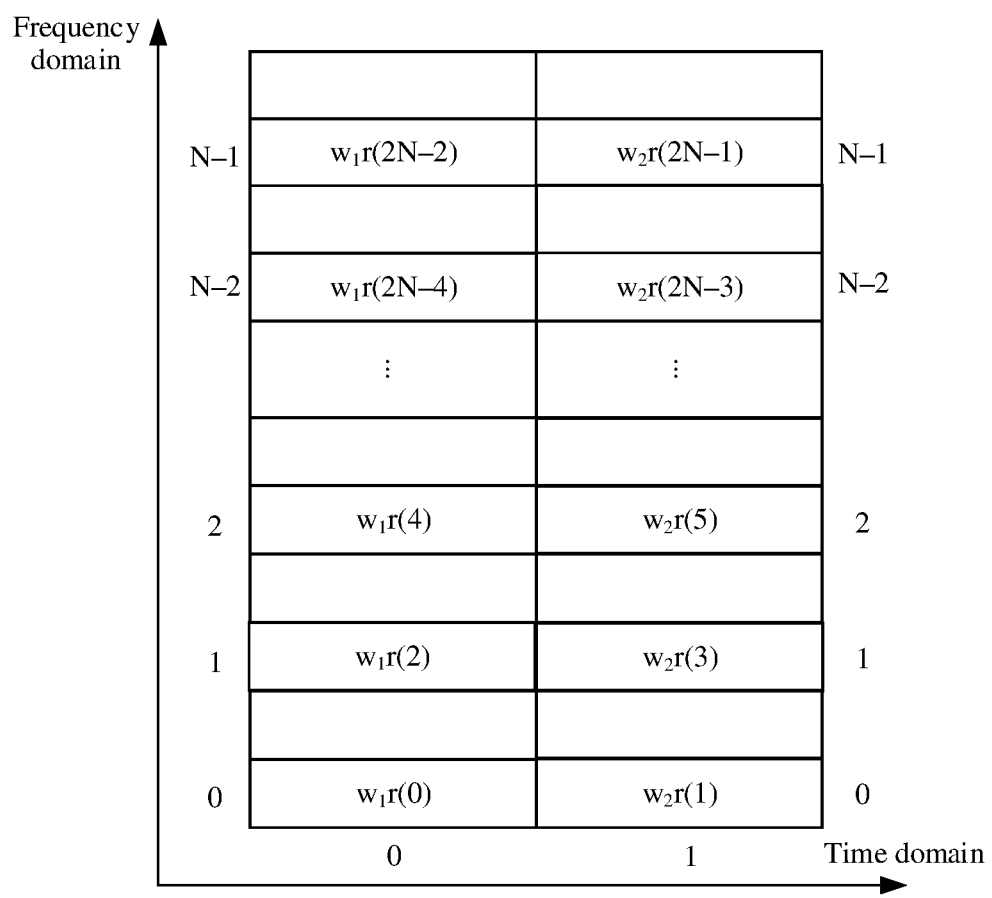
FIG. 6 is a schematic diagram of another mapping manner of a reference signal sequence according to an embodiment of this application.

For example, it is assumed that M=2. If sequences on adjacent symbols are multiplied by the OCC ([$w_1, w_2$]=[1,1] or [$w_1, w_2$]=[1, −1]), schematic diagrams of mapping manners shown in FIG. 5 and FIG. 6 may be obtained. In FIG. 5, combs corresponding to the symbol 0 and the symbol 1 are different. In FIG. 6, combs corresponding to the symbol 0 and the symbol 1 are the same.

3. Third Mapping Manner: $k_{m,n}=n+(M-1-m)\times N$

It may be learned from the foregoing formula that, when m=0 and n=0, $k_{0,0}=(M-1)\times N$, that is, an element on a symbol 0 and a subcarrier 0 corresponding to the symbol 0 is an $((M-1)\times N)^{th}$ element r((M−1)×N) in the reference signal sequence. When m=1 and n=0, $k_{1,0}=(M-2)\times N$, that is, an element on a symbol 1 and a subcarrier 0 corresponding to the symbol 1 is an $((M-2)\times N)^{th}$ element r((M−2)×N) in the reference signal sequence. When m=0 and n=1, $k_{0,1}=1+(M-1)\times N$, that is, an element on a symbol 0 and a subcarrier 1 corresponding to the symbol 0 is a $(1+(M-1)\times N)^{th}$ element r(1+(M−1)×N) in the reference signal sequence. When m=1 and n=1, $k_{1,1}=1+(M-2)\times N$, that is, an element on a symbol 1 and a subcarrier 1 corresponding to the symbol 1 is a $(1+(M-2)\times N)^{th}$ element r(1+(M−2)×N) in the reference signal sequence. Therefore, the third mapping manner indicated by the foregoing formula is performing mapping in descending order of numbers of symbols. To be specific, N subcarriers corresponding to the last symbol are first mapped, then N subcarriers corresponding to the last but one symbol are mapped, and so on, until subcarriers corresponding to the M symbols are completely mapped.

Figure 7:
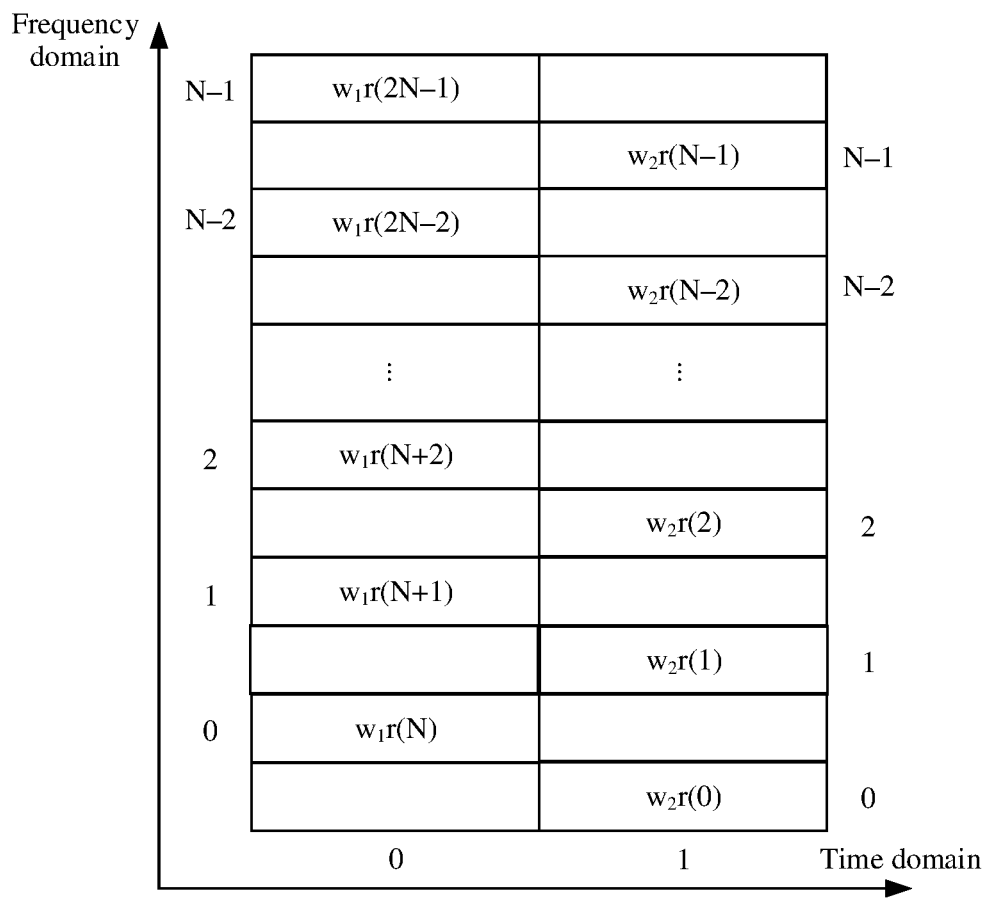
FIG. 7 is a schematic diagram of another mapping manner of a reference signal sequence according to an embodiment of this application.
Figure 8:
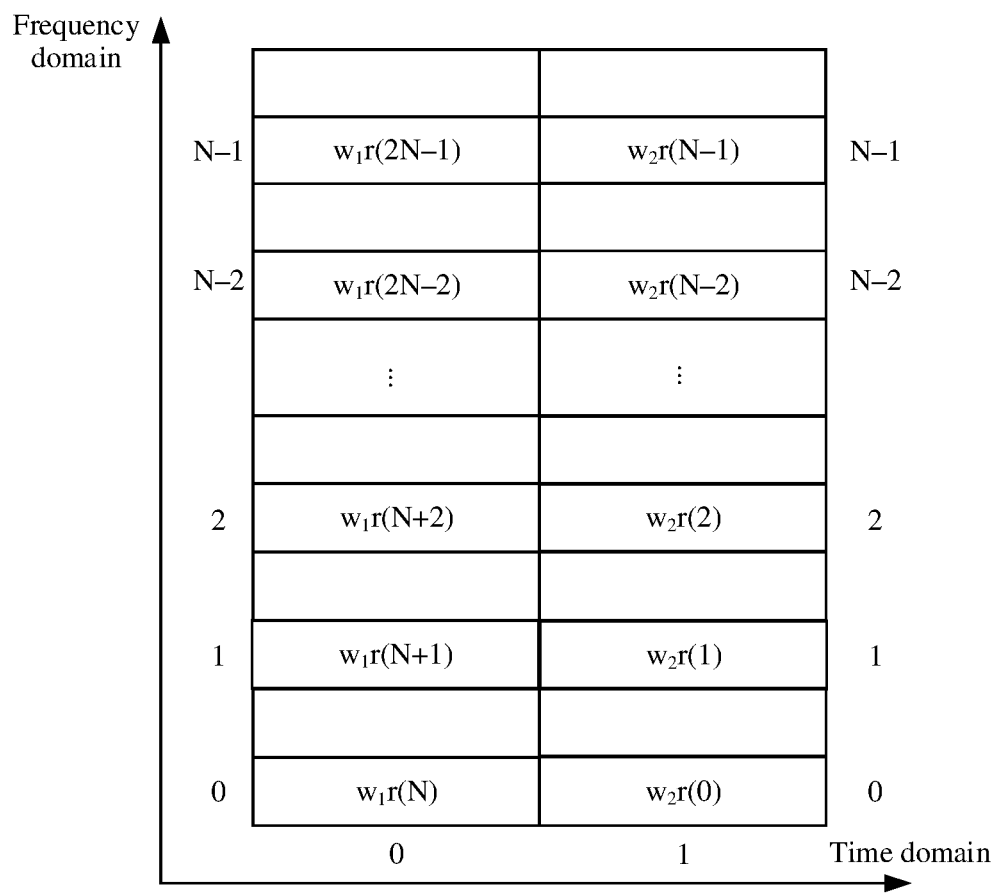
FIG. 8 is a schematic diagram of another mapping manner of a reference signal sequence according to an embodiment of this application.

For example, it is assumed that M=2. If sequences on adjacent symbols are multiplied by the OCC ([$w_1, w_2$]=[1,1] or [$w_1, w_2$]=[1, −1]), schematic diagrams of mapping manners shown in FIG. 7 and FIG. 8 may be obtained. In FIG. 7, combs corresponding to the symbol 0 and the symbol 1 are different. In FIG. 8, combs corresponding to the symbol 0 and the symbol 1 are the same.

4. Fourth Mapping Manner: $k_{m,n}=M\times n+(M-1-m)$

It may be learned from the foregoing formula that, when m=0 and n=0, $k_{0,0}=M-1$, that is, an element on a symbol 0 and a subcarrier 0 corresponding to the symbol 0 is an $(M-1)^{th}$ element r(M−1) in the reference signal sequence. When m=1 and n=0, $k_{1,0}=M-2$, that is, an element on a symbol 1 and a subcarrier 0 corresponding to the symbol 1 is an $(M-2)^{th}$ element r(M−2) in the reference signal sequence. When m=0 and n=1, $k_{0,1}=M+(M-1)=2M-1$, that is, an element on a symbol 0 and a subcarrier 1 corresponding to the symbol 0 is a $(2M-1)^{th}$ element r(2M−1) in the reference signal sequence. When m=1 and n=1, $k_{1,1}=M+(M-2)=2M-2$, that is, an element on a symbol 1 and a subcarrier 1 corresponding to the symbol 1 is a $(2M-2)^{th}$ element r(2M−2) in the reference signal sequence. Therefore, the fourth mapping manner indicated by the foregoing formula is performing alternate mapping in descending order of numbers of symbols. To be specific, the $1^{st}$ subcarrier of the last symbol is first mapped, then the $1^{st}$ subcarrier of the last but one symbol is mapped, and so on, until subcarriers corresponding to the M symbols are completely mapped.

Figure 9:
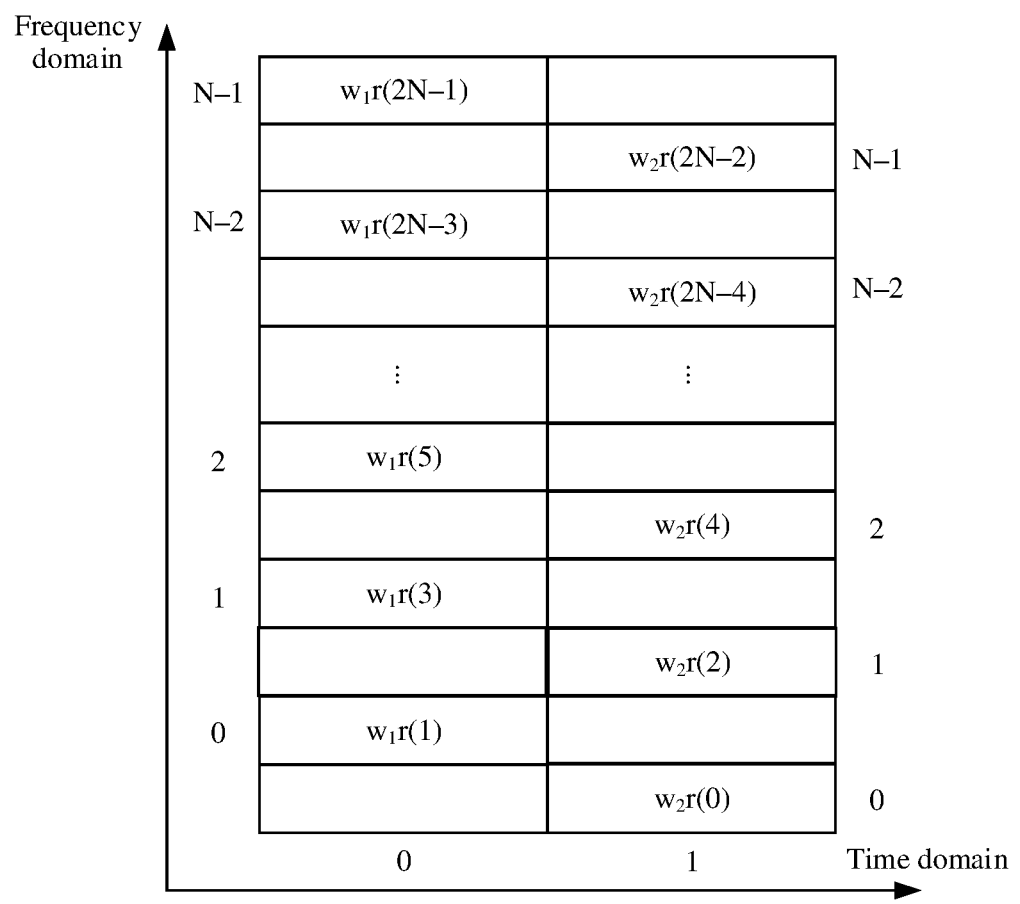
FIG. 9 is a schematic diagram of another mapping manner of a reference signal sequence according to an embodiment of this application.
Figure 10:
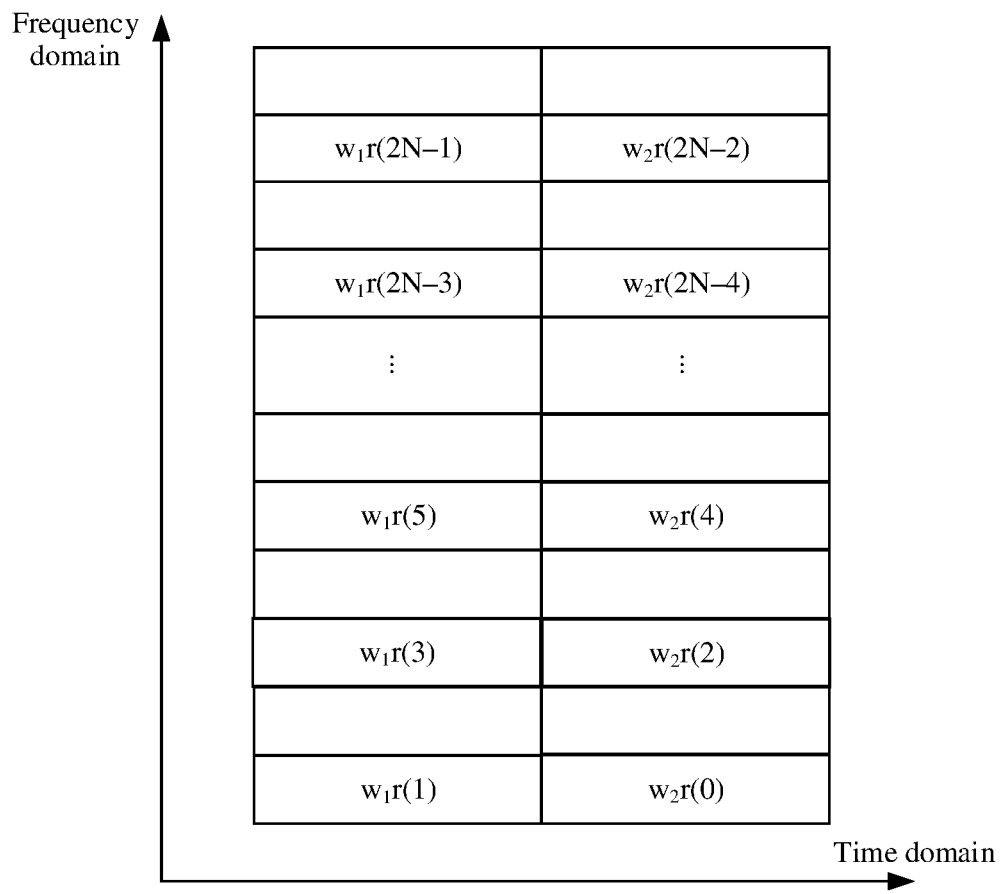
FIG. 10 is a schematic diagram of another mapping manner of a reference signal sequence according to an embodiment of this application.

For example, it is assumed that M=2. If sequences on adjacent symbols are multiplied by the OCC ([$w_1, w_2$]=[1,1] or [$w_1, w_2$]=[1, −1]), schematic diagrams of mapping manners shown in FIG. 9 and FIG. 10 may be obtained. In FIG. 9, combs corresponding to the symbol 0 and the symbol 1 are different. In FIG. 10, combs corresponding to the symbol 0 and the symbol 1 are the same.

It should be understood that, in this embodiment of this application, the transmit end may map the reference signal sequence to the time-frequency resource in the plurality of mapping manners. This application schematically shows several mapping manners between elements of the reference signal sequence and a time domain resource. In a specific implementation process, the foregoing mapping manners may be implemented by using a formula, a table, or another manner. This is not limited in this embodiment of this application. In a specific implementation process, the mapping manner may be agreed on in a protocol, or may be configured by the network device for the terminal device by using signaling. For example, the network device may configure one or more of the mapping manners for the terminal device by using radio resource control (RRC) signaling. This is not limited in this embodiment of this application.

In an optional embodiment, any two of the M symbols correspond to different combs, that is, the subcarriers of the M symbols are the M different combs in the sub-band. In the time-frequency resource, an element mapped to a subcarrier p is a $p^{th}$ element in the reference signal sequence, p is a number (which may also be understood as an absolute number of the subcarrier) obtained by sorting subcarriers in the time-frequency resource in descending order or ascending order of subcarrier frequencies, and p is an integer greater than or equal to 0.

It should be understood that, it is different from the foregoing four mapping manners that in this embodiment of this application, a subcarrier number is the absolute number of the subcarrier in the time-frequency resource. As shown in FIG. 5 and FIG. 9, subcarrier numbers are sequentially 0 to 2N−1 from bottom to top, and p∈{0,1, . . . , 2N−1}. The $0^{th}$ element r(0) in the reference signal sequence is mapped to the $0^{th}$ subcarrier, the $1^{st}$ element r(1) in the reference signal sequence is mapped to the $1^{st}$ subcarrier, . . . , and a $(2N-1)^{th}$ element r(2N−1) in the reference signal sequence is mapped to a $(2N-1)^{th}$ subcarrier.

In this embodiment of this application, the reference signal sequence is mapped in a manner in which different symbols correspond to different combs and the absolute number of the subcarrier corresponds to an element number of the reference signal sequence. Channels of adjacent symbols may be considered as basically unchanged. The receive end may combine signals on a plurality of symbols to form a complete signal, so that the cross-correlation of the original long sequence can be better retained, the cross-correlation between the different sequences is reduced, and the interference is reduced.

It should be understood that, sequence numbers of the foregoing processes do not mean execution sequences. The execution sequences of the processes should be determined based on functions and internal logic of the processes, and should not be construed as any limitation on the implementation processes of embodiments of this application.

The reference signal transmission method in embodiments of this application is described in detail above with reference to FIG. 1 and FIG. 10, and reference signal transmission apparatuses in embodiments of this application are described in detail below with reference to FIG. 11 and FIG. 12.

Figure 11:
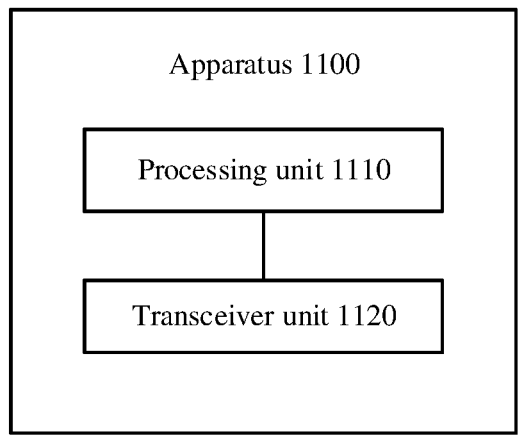
FIG. 11 is a schematic block diagram of a reference signal transmission apparatus according to an embodiment of this application.

FIG. 11 shows a reference signal transmission apparatus 1100 according to an embodiment of this application. In a design, the apparatus 1100 may be the foregoing transmit end, or may be a chip in the transmit end. In another design, the apparatus 1100 may be the foregoing receive end, or may be a chip in the receive end. The apparatus 1100 includes a transceiver unit 1110 and a processing unit 1120.

In a possible implementation, the apparatus 1100 is configured to perform procedures and steps corresponding to the transmit end in the method 200.

The processing unit 1110 is configured to: determine a time-frequency resource occupied by a reference signal, where the time-frequency resource includes M symbols in time domain and N subcarriers corresponding to each of the M symbols in frequency domain, M is an integer greater than or equal to 2, and N is an integer greater than 1; and generate a reference signal sequence with a length of M×N.

The transceiver unit 1120 is configured to map the reference signal sequence to the time-frequency resource for sending.

Optionally, the M symbols are consecutive in time domain, and reference signals on the M symbols occupy a same sub-band in frequency domain.

Optionally, each of the M symbols corresponds to N subcarriers of a same comb.

Optionally, a first symbol in the M symbols corresponds to N subcarriers of a first comb, a second symbol in the M symbols corresponds to N subcarriers of a second comb, and the first comb and the second comb are different.

Optionally, any two of the M symbols correspond to different combs. In the time-frequency resource, an element mapped to a subcarrier p is a $p^{th}$ element in the reference signal sequence, p is a number obtained by sorting subcarriers in the time-frequency resource in descending order or ascending order of subcarrier frequencies, and p is an integer greater than or equal to 0.

Optionally, in the time-frequency resource, an element mapped to a symbol m in the M symbols and a subcarrier n in N subcarriers corresponding to the symbol m is a $k_{m,n}$ th element in the reference signal sequence.

$k_{m,n}$ satisfies any one of the following formulas:

$$k_{m,n}=n+m\times N,$$

$$k_{m,n}=M\times n+m,$$

$$k_{m,n}=n+(M-1-m)\times N, \text{ and}$$

$$k_{m,n}=M\times n+(M-1-m).$$

$n \in \{0,1, \ldots, N-1\}$, and $m \in \{0,1, \ldots, M-1\}$,

Optionally, the reference signal sequence satisfies the following formula:

$$r(i)=Ae^{ja i}x_q(i \bmod N_{ZC}), \text{ where}$$

$$x_q(k) = e^{-j\frac{pqk(k+1)}{N_{ZC}}}.$$

r(i) represents an $i^{th}$ element in the reference signal sequence, i is an integer greater than or equal to 0 and less than or equal to M×N−1, $N_{ZC}$ is a maximum prime number less than or equal to M×N or a minimum prime number greater than M×N, q is a positive integer less than $N_{ZC}$, A is a complex number, and a is a real number.

Optionally, a is predefined, or is indicated by a network device by using signaling.

In another possible implementation, the apparatus 1100 is configured to perform procedures and steps corresponding to the receive end in the method 200.

The processing unit 1110 is configured to determine a time-frequency resource occupied by a reference signal, where the time-frequency resource includes M symbols in time domain and N subcarriers corresponding to each of the M symbols in frequency domain, M is an integer greater than or equal to 2, and N is an integer greater than 1.

The processing unit 1120 is configured to receive the reference signal on the time-frequency resource, where the reference signal is obtained by mapping a reference signal sequence with a length of M×N.

Optionally, the M symbols are consecutive in time domain, and reference signals on the M symbols occupy a same sub-band in frequency domain.

Optionally, each of the M symbols corresponds to N subcarriers of a same comb.

Optionally, a first symbol in the M symbols corresponds to N subcarriers of a first comb, a second symbol in the M symbols corresponds to N subcarriers of a second comb, and the first comb and the second comb are different.

Optionally, any two of the M symbols correspond to different combs. In the time-frequency resource, an element mapped to a subcarrier p is a $p^{th}$ element in the reference signal sequence, p is a number obtained by sorting subcarriers in the time-frequency resource in descending order or ascending order of subcarrier frequencies, and p is an integer greater than or equal to 0.

Optionally, in the time-frequency resource, an element mapped to a symbol m in the M symbols and a subcarrier n in N subcarriers corresponding to the symbol m is a $k_{m,n}$ th element in the reference signal sequence.

$k_{m,n}$ satisfies any one of the following formulas:

$$k_{m,n}=n+m\times N,$$

$$k_{m,n}=M\times n+m,$$

$$k_{m,n}=n+(M-1-m)\times N, \text{ and}$$

$$k_{m,n}=M\times n+(M-1-m).$$

$n \in \{0,1, \ldots, N-1\}$, and $m \in \{0,1, \ldots, M-1\}$.

Optionally, the reference signal sequence satisfies the following formula:

$$r(i)=Ae^{ja i}x_q(i \bmod N_{ZC}), \text{ where}$$

$$x_q(k) = e^{-j\frac{pqk(k+1)}{N_{ZC}}}.$$

r(i) represents an $i^{th}$ element in the reference signal sequence, i is an integer greater than or equal to 0 and less than or equal to M×N−1, $N_{ZC}$ is a maximum prime number less than or equal to M×N or a minimum prime number greater than M×N, q is a positive integer less than $N_{ZC}$, A is a complex number, and a is a real number.

Optionally, a is predefined, or is indicated by a network device by using signaling.

It should be understood that, the apparatus 1100 herein is presented in a form of functional units. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1100 may be specifically the transmit end or the receive end in the foregoing embodiments, and the apparatus 1100 may be configured to perform procedures and/or steps that correspond to the transmit end or the receive end in the foregoing method embodiments. To avoid repetition, details are not described herein again.

The apparatus 1100 in the foregoing solutions has a function of implementing corresponding steps performed by the transmit end or the receive end in the foregoing method. The function may be implemented by hardware, or may be implemented by hardware by executing corresponding software. The hardware or the software includes one or more modules corresponding to the foregoing function. For example, the transceiver unit 1110 may include a sending unit and a receiving unit. The sending unit may be configured to implement steps and/or procedures that correspond to the transceiver unit and that are for performing a sending action, and the receiving unit may be configured to implement steps and/or procedures that correspond to the transceiver unit and that are for performing a receiving action. The sending unit may be replaced with a transmitter, and the receiving unit may be replaced with a receiver, to separately perform receiving and sending operations and related processing operations in the method embodiments.

In this embodiment of this application, the apparatus 1100 in FIG. 11 may alternatively be a chip or a chip system, for example, a system on chip (system on chip, SoC). Correspondingly, the transceiver unit 1110 may be a transceiver circuit of the chip. This is not limited herein.

Figure 12:
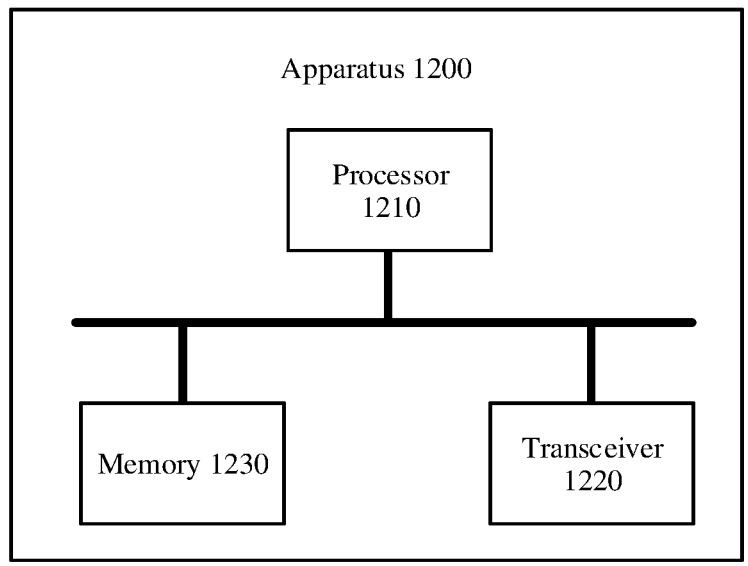
FIG. 12 is a schematic block diagram of another reference signal transmission apparatus according to an embodiment of this application.

FIG. 12 shows another reference signal transmission apparatus 1200 according to an embodiment of this application. The apparatus 1200 includes a processor 1210, a transceiver 1220, and a memory 1230. The processor 1210, the transceiver 1220, and the memory 1230 communicate with each other through an internal connection path. The memory 1230 is configured to store instructions, and the processor 1210 is configured to execute the instructions stored by the memory 1230, to control the transceiver 1220 to send a signal and/or receive a signal.

In a possible implementation, the apparatus 1200 is configured to perform procedures and steps corresponding to the terminal device in the method 200.

The processor 1210 is configured to: determine a time-frequency resource occupied by a reference signal, where the time-frequency resource includes M symbols in time domain and N subcarriers corresponding to each of the M symbols in frequency domain, M is an integer greater than or equal to 2, and N is an integer greater than 1; generate a reference signal sequence with a length of M×N; and map, through the transceiver 1220, the reference signal sequence to the time-frequency resource for sending.

In another possible implementation, the apparatus 1200 is configured to perform procedures and steps corresponding to the network device in the method 200.

The processor 1210 is configured to: determine a time-frequency resource occupied by a reference signal, where the time-frequency resource includes M symbols in time domain and N subcarriers corresponding to each of the M symbols in frequency domain, M is an integer greater than or equal to 2, and N is an integer greater than 1; and receive the reference signal on the time-frequency resource through the transceiver 1220, where the reference signal is obtained by mapping a reference signal sequence with a length of M×N.

It should be understood that the apparatus 1200 may be specifically the transmit end or the receive end in the foregoing embodiments, and may be configured to perform steps and/or procedures corresponding to the transmit end or the receive end in the foregoing method embodiments. Optionally, the memory 1230 may include a read-only memory and a random access memory, and provide the instructions and data to the processor. A part of the memory may further include a non-volatile random access memory. For example, the memory may further store information of a device type. The processor 1210 may be configured to execute the instructions stored in the memory. When the processor 1210 executes the instructions stored in the memory, the processor 1210 is configured to perform steps and/or procedures of the method embodiments corresponding to the transmit end or the receive end. The transceiver 1220 may include a transmitter and a receiver. The transmitter may be configured to implement steps and/or procedures that correspond to the transceiver and that are for performing a sending action, and the receiver may be configured to implement steps and/or procedures that correspond to the transceiver and that are for performing a receiving action.

It should be understood that in embodiments of this application, the processor in the foregoing apparatus may be a central processing unit (central processing unit, CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, steps in the foregoing method can be implemented by using a hardware integrated logical circuit in the processor, or by using instructions in a form of software. The steps of the method disclosed with reference to embodiments of this application may be directly performed by a hardware processor, or may be performed by using a combination of hardware and software units in the processor. A software unit may be located in a mature storage medium in the art, such as a random access memory, a flash memory, a read-only memory, a programmable read-only memory, an electrically erasable programmable memory, a register, or the like. The storage medium is located in the memory, and a processor reads instructions in the memory and completes the steps in the foregoing method in combination with hardware of the processor. To avoid repetition, details are not described herein again.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the method in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining a time-frequency resource to be occupied by a reference signal, wherein the time-frequency resource comprises M symbols in time domain, and for each of the M symbols, N subcarriers corresponding to the respective symbol in frequency domain, wherein M is an integer greater than or equal to 2, and N is an integer greater than 1;
   generating a reference signal sequence with a length of M×N; and
   mapping the reference signal sequence to the time-frequency resource for sending, wherein the complete reference signal is mapped to the M symbols, and each of the M symbols carries a portion of the complete reference signal.

2. The method according to claim 1, wherein the M symbols are consecutive in time domain, and the portions of the reference signal on the M symbols occupy a same sub-band in frequency domain.

3. The method according to claim 1, wherein the N subcarriers of each symbol of the M symbols are of a same comb.

4. The method according to claim 1, wherein a first symbol in the M symbols corresponds to N subcarriers of a first comb, a second symbol in the M symbols corresponds to N subcarriers of a second comb, and the first comb and the second comb are different combs.

5. The method according to claim 4, wherein:
   any two symbols of the M symbols correspond to different combs; and
   in the time-frequency resource, an element mapped to a subcarrier p is a $p^{th}$ element in the reference signal sequence, p is a number of a subcarrier when subcarriers are sorted in the time-frequency resource in descending order or ascending order of subcarrier frequencies, and p is an integer greater than or equal to 0.

6. An apparatus, comprising:
   a processor, coupled to a memory, wherein the memory is configured to store a program or instructions, and when the program or the instructions are executed by the processor, the apparatus is enabled to perform the method according to claim 1.

7. A non-transitory computer-readable storage medium, configured to store a computer program, wherein the computer program comprises instructions for implementing the method according to claim 1.

8. A method, comprising:
   determining a time-frequency resource to be occupied by a reference signal, wherein the time-frequency resource comprises M symbols in time domain, and for each of the M symbols, N subcarriers corresponding to the respective symbol in frequency domain, wherein M is an integer greater than or equal to 2, and N is an integer greater than 1; and
   receiving the reference signal on the time-frequency resource, wherein the reference signal is obtained by mapping a reference signal sequence with a length of M×N, wherein the complete reference signal is mapped to the M symbols, and each of the M symbols carries a portion of the complete reference signal.

9. The method according to claim 8, wherein the M symbols are consecutive in time domain, and the portions of the reference signal on the M symbols occupy a same sub-band in frequency domain.

10. The method according to claim 8, wherein the N subcarriers of each symbol of the M symbols are of a same comb.

11. The method according to claim 8, wherein a first symbol in the M symbols corresponds to N subcarriers of a first comb, a second symbol in the M symbols corresponds to N subcarriers of a second comb, and the first comb and the second comb are different combs.

12. The method according to claim 8, wherein:
any two symbols of the M symbols correspond to different combs; and
in the time-frequency resource, an element mapped to a subcarrier p is a $p^{th}$ element in the reference signal sequence, p is a number of a subcarrier when subcarriers are sorted in the time-frequency resource in descending order or ascending order of subcarrier frequencies, and p is an integer greater than or equal to 0.

13. An apparatus, comprising:
at least one processor, configured to:
determine a time-frequency resource occupied by a reference signal, wherein the time-frequency resource comprises M symbols in time domain, and for each of the M symbols, N subcarriers corresponding to the respective symbol in frequency domain, wherein M is an integer greater than or equal to 2, and N is an integer greater than 1; and
generate a reference signal sequence with a length of M×N; and
a transceiver, configured to map the reference signal sequence to the time-frequency resource for sending, wherein the complete reference signal is mapped to the M symbols, and each of the M symbols carries a portion of the complete reference signal.

14. The apparatus according to claim 13, wherein the M symbols are consecutive in time domain, and the portions of the reference signal on the M symbols occupy a same sub-band in frequency domain.

15. The apparatus according to claim 13, wherein the N subcarriers of each symbol of the M symbols are of a same comb.

16. The apparatus according to claim 13, wherein a first symbol in the M symbols corresponds to N subcarriers of a first comb, a second symbol in the M symbols corresponds to N subcarriers of a second comb, and the first comb and the second comb are different combs.

17. The apparatus according to claim 16, wherein:
any two symbols of the M symbols correspond to different combs; and
in the time-frequency resource, an element mapped to a subcarrier p is a $p^{th}$ element in the reference signal sequence, p is a number of a subcarrier when subcarriers in the time-frequency resource are sorted in descending order or ascending order of subcarrier frequencies, and p is an integer greater than or equal to 0.

18. An apparatus, comprising:
at least one processor, configured to determine a time-frequency resource occupied by a reference signal, wherein the time-frequency resource comprises M symbols in time domain, and for each of the M symbols, N subcarriers corresponding to the respective symbol in frequency domain, wherein M is an integer greater than or equal to 2, and N is an integer greater than 1; and
a transceiver, configured to receive the reference signal on the time-frequency resource, wherein the reference signal is obtained by mapping a reference signal sequence with a length of M×N, wherein the complete reference signal is mapped to the M symbols, and each of the M symbols carries a portion of the complete reference signal.

19. The apparatus according to claim 18, wherein the M symbols are consecutive in time domain, and the portions of the reference signal on the M symbols occupy a same sub-band in frequency domain.

20. The apparatus according to claim 18, wherein the N subcarriers of each symbol of the M symbols are of a same comb.

21. The apparatus according to claim 18, wherein a first symbol in the M symbols corresponds to N subcarriers of a first comb, a second symbol in the M symbols corresponds to N subcarriers of a second comb, and the first comb and the second comb are different combs.

22. The apparatus according to claim 18, wherein:
any two symbols of the M symbols correspond to different combs; and
in the time-frequency resource, an element mapped to a subcarrier p is a $p^{th}$ element in the reference signal sequence, p is a number of a subcarrier when subcarriers are sorted in the time-frequency resource in descending order or ascending order of subcarrier frequencies, and p is an integer greater than or equal to 0.

* * * * *